United States Patent [19]

Hubbard et al.

[11] 4,169,164

[45] Sep. 25, 1979

[54] LOW DENSITY COFFEE ROASTING PROCESS

[75] Inventors: Merton H. Hubbard, Hillsborough; Robert R. Phipps, San Francisco; Richard L. Thompson, Walnut Creek, all of Calif.

[73] Assignee: Hills Bros. Coffee, Inc., San Francisco, Calif.

[21] Appl. No.: 863,724

[22] Filed: Dec. 23, 1977

[51] Int. Cl.$^2$ .............................................. A23F 1/02

[52] U.S. Cl. ........................................ 426/467; 34/10; 99/474; 426/466

[58] Field of Search ............... 426/466, 467, 595, 594, 426/486, 450, 455; 34/10, 57 A, 57 B, 57 C; 99/477, 474

[56] References Cited

U.S. PATENT DOCUMENTS

| | | | |
|---|---|---|---|
| 2,212,120 | 8/1940 | Kreale et al. | 426/467 |
| 2,307,710 | 1/1943 | Polin et al. | 426/466 |
| 2,581,148 | 1/1952 | Scull et al. | 426/466 |
| 3,122,439 | 2/1964 | MacAllister et al. | 426/467 |
| 3,229,377 | 1/1966 | Hoyt | 34/57 A |
| 3,262,217 | 7/1966 | Brown et al. | 34/57 A |
| 3,595,668 | 7/1971 | Nutting et al. | 426/467 |

FOREIGN PATENT DOCUMENTS 814756  6/1959  United Kingdom ..................... 426/466

*Primary Examiner*—Kenneth M. Schor
*Attorney, Agent, or Firm*—Flehr, Hohbach, Test, Albritton & Herbert

[57] ABSTRACT

A coffee roasting process for forming roasted coffee in which the green coffee beans are dry roasted by passage in a fluidized bed through a two-stage roaster. In the first stage, the beans are heated by a roasting gas for partial roasting and expansion of their cellular structure. Then, in the second zone, the beans are contacted with an independent roasting gas stream at a temperature of 515° F.– 545° F. to stabilize the open structure of the beans and to provide the desired dark brown color without burning. The second gas is supplied at a lower velocity and higher temperature than the first gas. The roasted coffee bean product is of low density while providing high yield of soluble solids.

7 Claims, 3 Drawing Figures

LOW DENSITY COFFEE ROASTING PROCESS

BACKGROUND OF THE INVENTION

The invention relates to a two-stage continuous roasting process for coffee in which the roasted coffee product is of low density and high yield.

Green coffee is roasted to produce the desired dark brown color and to alter the natural elements present in the green beans to provide the aromatic qualities and taste or flavor values desired in a freshly brewed coffee beverage. One known technique for the continuous roasting of coffee is disclosed in Nutting et al U.S. Pat. No. 3,572,235. There, the coffee beans are first subjected to steam in a pre-heating zone and thereafter progressively moved as a fluidized bed through a roasting zone in which the pre-heated beans are contacted with a hot roasting gas at a temperature in the range of 450° F.–575° F. Then, the beans are dried by contact with an ambient air stream.

In recent years, the above process has been modified by the elimination of the pre-heating stage and the direct feeding of the green coffee beans into a two-stage roasting zone. In typical operation, the temperature in the first zone is on the order of 475° F. while in the second zone, the temperature is slightly higher, on the order of 485° F. This process (referred to herein as the "prior art process") produces a product of superior flavor, taste and aroma.

It is well known that the price of coffee has increased significantly in recent years. For economy, it would be desirable to increase the yield per volume of green coffee beans assuming that the quality of coffee could be maintained.

It is an object of the invention to provide a continuous roasting process in which the desired flavor and aroma characteristics are developed from the green coffee beans to produce a high yield, low density roasted coffee product.

It is a specific object of the invention to provide a roasting process of the foregoing type capable of forming a roasted coffee product of substantially reduced density and of comparable yield to that of conventional ground roast coffee.

Additional objects and features of the invention will appear from the following detailed description taken in conjunction with the accompanying drawings.

DETAILED DESCRIPTION OF THE PREFERRED EMBODIMENTS

Figure 1:
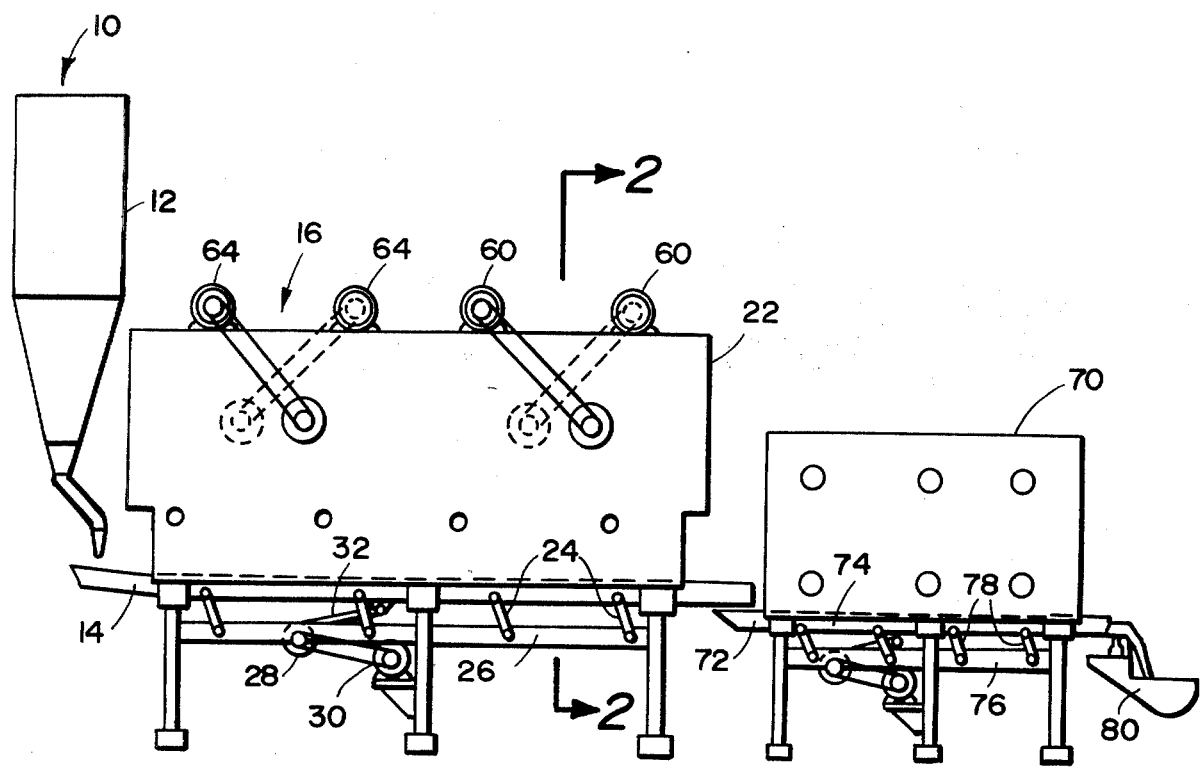
FIG. 1 is a schematic representation of apparatus suitable for performing the continuous roasting process of the present invention.

In general, the present process is directed toward a two-stage roasting process carried out under conditions to form a high yield, low density roasted coffee product. The beans are progressively and continuously moved and agitated through the two roasting stages in a fluidized bed and thereafter cooled and ground to form the final product.

Referring specifically to the first stage or zone of the two-stage roasting process, green coffee beans are subjected to a high velocity heated roasting gas to effect at least a partial roasting of the coffee beans. It has been found that by controlling the conditions in this first zone, the cellular structure of the coffee beans is expanded. The roasting gases are passed into the coffee beans as high velocity streams of roasting gas which pass through the bed of beans at a sufficient rate to induce fluidization of the beans into a bed to provide uniform heating of the beans. The preferred depth of the bed to provide the desired amount of heating in both the first and second stage of the process is on the order of 1 to 3 inches and preferably about 2 inches.

As set forth above, the heating conditions in the first zone are maintained to provide an expansion of the cellular structure of the coffee beans. This, in turn, produces a disrupted or slightly puffed condition to the beans which forms porous openings or passageways from the surface of the beans to the interior of the same. This expanded structure permits a highly efficient penetration or entry of roasting gases into the coffee beans during roasting and also provides more ready access to the soluble solids content of the beans by the action of heated water during brewing of the coffee beverage. In this manner, the yield of the product is increased.

Suitable heating conditions in the first zone stage include a temperature of the roasting gas of about 440° F. to 470° F., and preferably about 450° F. to 460° F. The flow rate of the roasting gas at this temperature for a given residence time and bed depth determines the heat input to the beans. A suitable air flow in this stage is on the order of from about 19,000 to 21,000 standard cubic feet per minute at a residence time on the order of 2 to 5 minutes for the first stage.

After passage through the first stage or zone, the fluidized bed of coffee beans move into the second zone in a bed of constant depth. In the second zone, the roasting conditions are substantially altered. There, roasting is completed under conditions to stabilize the open porous structure of the beans and to darken them into the desired dark brown color without burning. In addition, the conditions are adjusted to form a high yield, low density roasted coffee product. In general, this is accomplished by substantially increasing the temperature of the high velocity roasting gas contacting the coffee beans to a temperature between about 515° F. and 545° F., and preferably to a temperature on the order of 530° F. At this high temperature, it is desirable to reduce the roasting gas velocity so that the total heat input to the coffee beans in the second stage is insufficient to cause burning. It has been found that at a residence time similar to that of the first zone (2–5 minutes), a suitable roasting gas velocity is less than about 18,000 cubic feet per minute and preferably on the order of 17,000 cubic feet per minute or less.

After completion of roasting in the second zone, a continuous stream of the roasted coffee beans is cooled rapidly by a suitable cooling technique to arrest the roasting operation and maintain the open cellular porous structure of the coffee beans. A suitable technique for such rapid cooling is by directing (e.g., by blowing or drawing), an ambient air stream through a fluidized bed of the roasted coffee product. Cooling is typically completed in a relatively short period of time, ranging from 0.5 to 10 minutes and generally from 0.5 to 2 minutes. Such cooling is preferably performed by employing streams of high velocity ambient air which pass through the roasted beans at a rate sufficient to fluidize the same in a manner similar to that of the fluidized roasting process on the first and second zones. Cooling in this manner is performed in less than about 2 minutes.

FIG. 1 schematically illustrates apparatus for carrying out the continuous roasting process of the present invention. Green coffee beans are introduced to the system at 10 to a suitable feed hopper 12 and are directed onto an inclined chute or ramp 14 with the result that the beans are force fed by gravity into the two-stage roaster unit 16.

Figure 3:
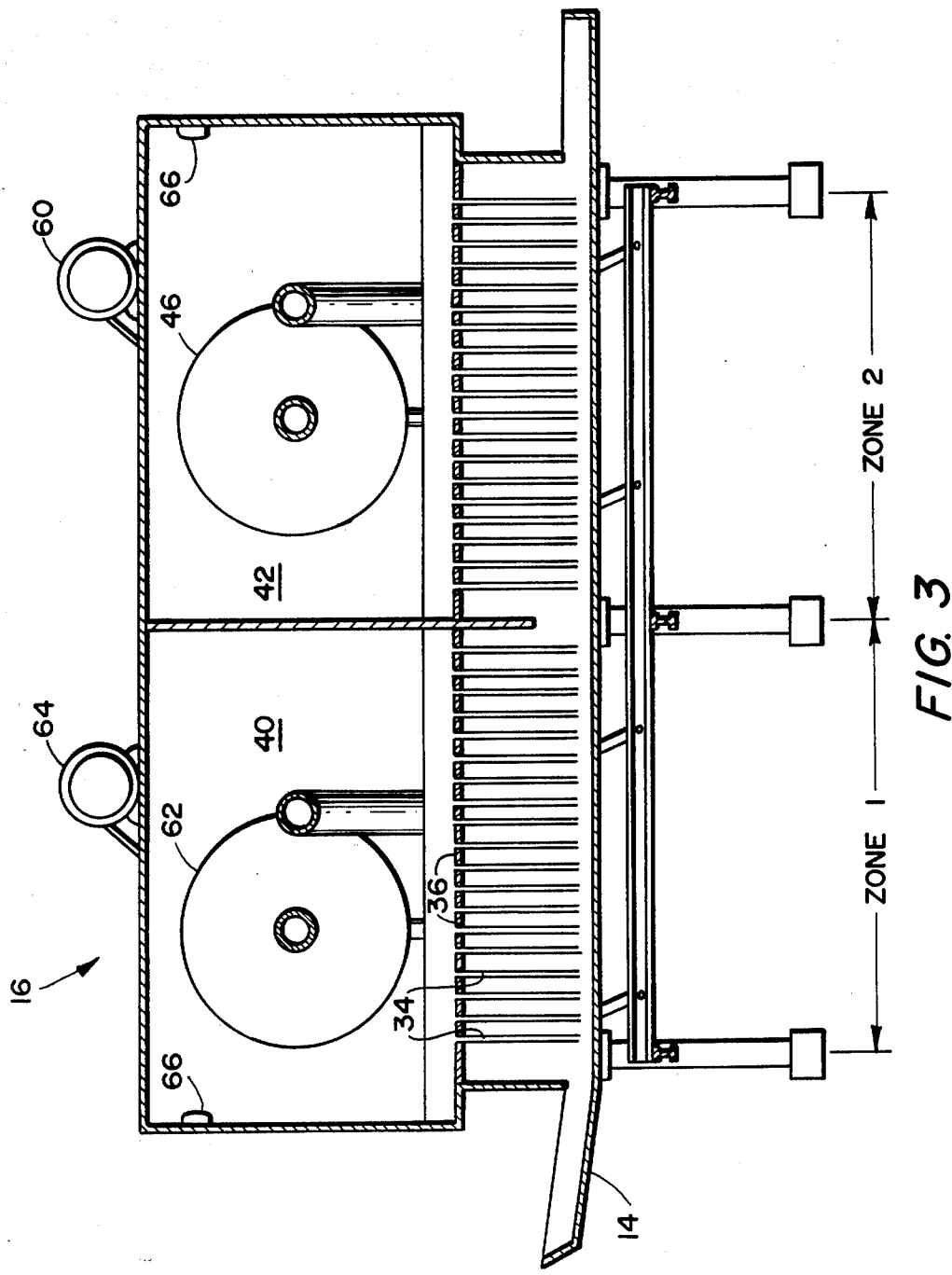
FIG. 3 is an enlarged view of the roasting apparatus of FIG. 2 taken along the line 3—3 of FIG. 2.

Roaster 16 operates to provide a controlled oxidizing heat treatment of the green coffee beans. High velocity streams of heated roasting gas function to fluidize the beans within the roasting unit 16 and thereby to provide a uniform, even heat treatment. The roaster apparatus includes a gas impervious bed forming plate 20 mounted for sliding vibratory movements with respect to the main housing 22 by means of parallelogram links 24 pivotally connected to the support frame 26. The plate 20 is vibrated in a conventional manner by a rotary eccentric 28 driven by motor 30 connected to the plate by means of connector link 32. The apparatus is of the type illustrated in the aforementioned U.S. Pat. No. 3,572,235. It includes a pattern of nozzles or tubes 34 which are suspended from a partition 36 which separates an upper plenum within the roaster housing from an exhaust chamber 40. Referring specifically to FIG. 3, the plenum is divided into a first roasting zone 40 and a second roasting zone 42 by an impermeable partition 44 which extends from the top to the bottom of the roasting chamber in a vertical direction to provide a barrier against air flowing between zones 40 and 42. The two zones are so designated in FIG. 3.

Referring to the second roasting zone 42, fans or blowers 46 are provided on opposite sides of the zone to control the flow of air into the upper plenum chamber and through tubes 34 to achieve a high velocity jet action below each tube, illustrated at 48, which serves to suspend the coffee beans in a fluidized state as they progress through the roaster. As described in the foregoing patent, the fluidizing effect is achieved by jetting of the roasting gases downwardly onto the gas impermeable plate 20 simultaneously with a rapid withdrawal of the gases upwardly through the blower units, for example, as illustrated by the arrows 50 and 52. Major portions of the recirculated gases is returned to the tubes 34 as indicated by the arrows 54, while a portion of the gases is simultaneously removed from the roaster through exhaust ducts 56 as indicated by the arrows 58. As illustrated in FIG. 1, the blower units are suitably driven by motors or like drive units 60 which can be controlled to provide the desired gas velocities within tubes 34. Referring to FIG. 3, independent fans or blower units 62 are provided at opposite sides of the first stage plenum chamber 40 driven by motor 64 of a similar type to fans or blowers 46.

Figure 2:
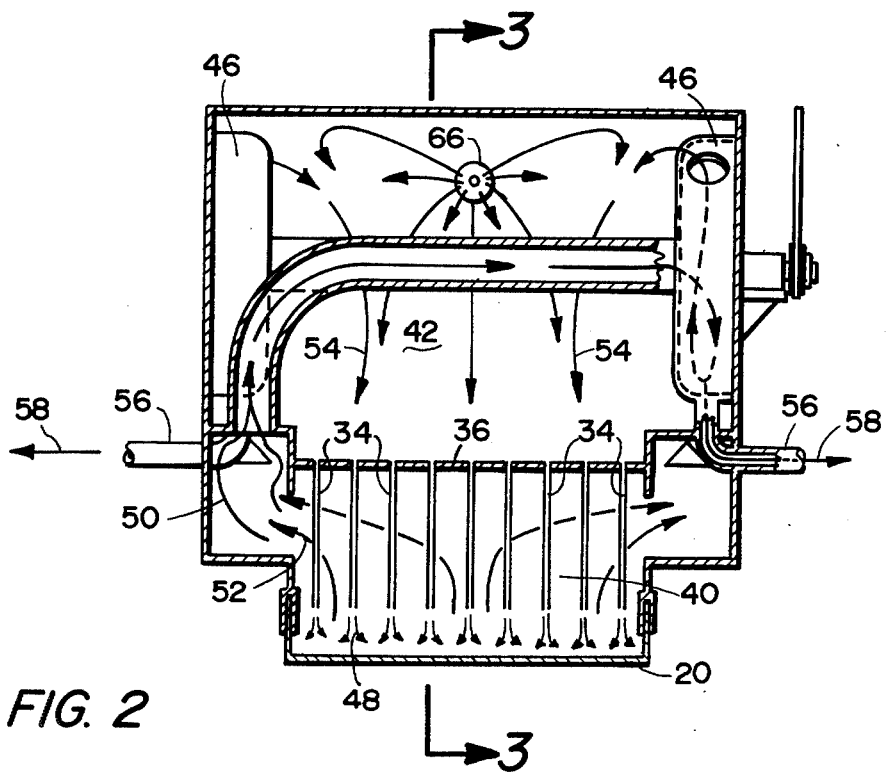
FIG. 2 is an enlarged view in transverse section of the roaster of FIG. 1, taken along the line 2—2.

Referring again to the first zone, the circulating gases are heated to effect the desired heat treatment for the roast. Heating of the roasting gases may be accomplished by any suitable means. As illustrated in FIGS. 2 and 3, the roasting gases are directly heated by injection and burning of a fuel gas within the plenum space of roaster unit 16. Apparatus for this purpose is illustrated in the form of injection nozzles 66 on opposite sides of partition 44. Burning of the fuel gas (i.e., natural gas, propane or the like) within the plenum is accomplished by introduction of combustible mixtures of the gas with combustion air through each of nozzles 66. The combustion gas is being distributed in separate independent streams in the first and second plenum roasting zones 40 and 42, respectively, separated by partition 44. In this manner, the different roasting conditions of temperature and roasting gas velocities are maintained in each of the two roasting zones.

After the roasting operation in roaster 16, the hot roasted beans are discharged from the end of bed forming plate 20 into cooling unit 70 as illustrated in FIG. 1. Beans are received on a chute or ramp 72 which is similar in construction to feed ramp 14 for the roaster unit 16. The entire cooling unit may be similar in construction to the roaster unit, with the ramp 72 forming a part of a vibrated gas-impervious plate 74 within the cooler. The plate 74 is supported on frame work 76 connected by similar parallelogram linkage including links 78. After cooling in unit 70, the beans are collected in a suitable basic 80 for subsequent unit operations including grinding and packaging. Cooling gases (i.e., ambient air) may be circulated within the cooling unit by a fan or blower which functions to direct cooling air downwardly through tubes in the same manner as in the roaster.

In a typical operation, the beans are advanced onto ramp 14 at a rate so that the progress of the beans through both stages of the roaster is accomplished in a period of about 4 to 10 minutes and preferably 6 to 9 minutes, with equal residence times in each stage. The beans are progressively moved at a constant state of fluidization induced by the circulating roasting gases to provide a fluidized bed at a depth on the order of 2 inches. A suitable feed rate may be on the order of 7200 pound of coffee per hour. In the first roasting zone, a typical temperature is on the order of 450°–460° F., at a roasting gas flow velocity induced by the fan of about 20,000 cubic feet per minute. Here, the initial heating of the beans to the roasting temperature is accomplished while the cellular structure of the beans is expanded to provide a network of interconnecting pores.

In the second zone of roasting below plenum 42, the temperature of the roasting gas is about 530° F. with a reduced flow velocity of on the order of 17,000 standard cubic feet per minute. The roasted beans continue to develop the desired darker brown color without burning and without losing the expanded porous cellular structure formed in the first zone. Thereafter, the coffee is passed through the cooling unit 70 in a fluidized bed of the same depth. There, the beans are subjected to a gas stream at a flow rate similar to that in the roaster unit to provide rapid cooling. A typical residence time for adequate cooling is on the order of 0.5 to 2 minutes. Such rapid cooling is believed to assist in maintaining the open cellular porous structure of the coffee beans.

The roasted coffee product produced by the foregoing process is of substantially lower density than the product produced by the prior art process described in the Background section of the present specification. The latter product is referred to herein as "the prior art product." The density of a number of samples of the prior art product ranged from 0.400 to 0.446 gm/cc with an average value of 0.417 gm/cc. The technique employed for measurement is to tap a 250 cc graduated cylinder containing 50 grams of sample for 250 strokes. The density of the tapped volume is determined by dividing the 50 grams by the volume left in the graduated cylinder. In contrast the product of the present invention has a density less than 0.39 gm/cc, i.e., a range of 0.333 to 0.385 gm/cc with an average value of 0.357 gm/cc.

The difference in densities may be expressed in a different manner. Thus, due to the lighter density of the present product, 26 ounces of such product provides approximately the same number of scoops in a two pound can of coffee as does 32 ounces of the prior art product. In other words, there is an approximate 25% reduction in weight of comparable volumes of the prior art products. This also leads to economy of shipping.

Unexpectedly, it has been found that the low density coffee of the present invention yields a coffee beverage of comparable strength to that of the higher density prior art product. More soluble solids are obtained in the final beverage product based upon a given volume of green coffee beans in accordance with the present process. This leads to significant economy in yielding more coffee beverage per bean.

The following Table 1 illustrates a comparison of soluble solids content of a brew formed by the present process with that of the prior art of roasting by different coffee brew techniques and different measurement techniques. The conditions for (1) "the prior art process" are those set forth in the background of the invention while the conditions for (2) "the present process" are set forth in the foregoing description of a typical operation. The oven method (3) of measurement of soluble solids content of the brew is performed by evaporating the water content of the brew and weighing the residue. The hydrometer method (4) of measurement is performed by conventional hydrometric techniques. Similarly, the standard coffee measures/cup of coffee are those employed in standard measurements in the coffee field.

Table 1

| Coffee Brew Technique | Standard Coffee Measures/Cups Of Coffee | Roasting Process | Soluble Solids Content of Brew (%) | |
|---|---|---|---|---|
| | | | (3) | (4) |
| Stove Percolation | 5/6 | (1) | 0.93 | 0.91 |
| | | (2) | 0.87 | 0.92 |
| Electric Percolation | 8/10 | (1) | 1.06 | 1.06 |
| | | (2) | 1.01 | 1.11 |
| Automatic Drip | 6/10 | (1) | 0.92 | 1.1 |
| | | (2) | 1.02 | 1.16 |

(1) Prior Art Process
(2) Present Process
(3) Oven Method of Measurement
(4) Hydrometer Method of Measurement It is apparent from Table 1 that the soluble solids content of brew formed by the prior art roasting process and that formed by the process of the present invention are comparable within the degree of accuracy of the measurement procedures. Thus, the average of the soluble solids content by the two methods of measurement for the present roasting process is slightly lower than that of the prior art process for stove percolation, is almost identical for electric percolation, and is higher for automatic drip.

It has been found that the excellent flavor, taste and aroma associated with a coffee beverage freshly brewed from roasted beans formed by the prior art roasting process is also obtained for the higher yield, low density product of the present invention. Taste tests have indicated that the brew obtained from the different roasted coffee products is not distinguishable. Thus, it is apparent that the present product has increased the yield of brew from the green coffee beans while decreasing the shipping costs of the roasted ground coffee product to the consumer.

What is claimed is:

1. A continuous process for dry roasting green coffee beans comprising the steps of progressively and continuously moving and agitating dry green coffee beans in a fluidized bed successively through first and second separate roasting chambers, the beans being uniformly contacted in the first chamber with a dry high velocity roasting gas stream which fluidizes said beans, said gas being at a temperature from about 440° F. to 470° F. and the gas contact effecting at least a partial roasting of the beans and an expansion of the cellular structure of the beans, then passing the beans through a second chamber in which the beans are uniformly contacted with an independent dry roasting gas stream which fluidizes said beans, said independent gas stream being at a lower velocity and higher temperature than in the first chamber so as to stabilize the open structure of the beans and to darken the beans without burning them, said second chamber roasting gas temperature being between about 515° F. and 545° F., and then cooling the beans to form a high soluble solids yield, low density roasted coffee product.

2. The method of claim 1 in which the tapped bulk density of said roasted coffee product is less than about 0.39 gm/cc.

3. The method of claim 1 in which the roasting gas velocity in said second chamber is less than about 18,000 standard cubic feet per minute.

4. The method of claim 1 in which the roasting gas velocity in said first chamber is from about 19,000 to 21,000 standard cubic feet per minute.

5. The method of claim 1 in which the total residence time in said first and second roasting chambers is from about 5 to 10 minutes.

6. The method of claim 1 in which the average depth of said fluidized bed is from about one to three inches.

7. The method of claim 1 in which cooling is performed by directing ambient air through a fluidized bed of the roasted coffee product.

* * * * *